United States Patent
Peng et al.

(10) Patent No.: US 11,445,503 B2
(45) Date of Patent: Sep. 13, 2022

(54) DATA TRANSMISSION METHOD AND DEVICE FOR MULTIPLE RADIO FREQUENCY SYSTEMS, STORAGE MEDIUM AND TERMINAL

(71) Applicant: SPREADTRUM COMMUNICATIONS (SHANGHAI) CO., LTD., Shanghai (CN)

(72) Inventors: Yexin Peng, Shanghai (CN); Xin Liu, Shanghai (CN); Chinghwa Yu, Shanghai (CN); Yantao Li, Shanghai (CN); Yanchao Xu, Shanghai (CN); Long Wang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 64 days.

(21) Appl. No.: 17/042,576

(22) PCT Filed: Apr. 23, 2019

(86) PCT No.: PCT/CN2019/083826
§ 371 (c)(1),
(2) Date: Sep. 28, 2020

(87) PCT Pub. No.: WO2020/172982
PCT Pub. Date: Sep. 3, 2020

(65) Prior Publication Data
US 2021/0022135 A1 Jan. 21, 2021

(30) Foreign Application Priority Data
Feb. 26, 2019 (CN) .......................... 201910142207.5

(51) Int. Cl.
H04W 72/04 (2009.01)
H04L 47/27 (2022.01)
H04W 84/12 (2009.01)

(52) U.S. Cl.
CPC ......... *H04W 72/0446* (2013.01); *H04L 47/27* (2013.01); *H04W 84/12* (2013.01)

(58) Field of Classification Search
CPC ............. H04W 72/0446; H04W 84/12; H04W 74/0808; H04W 72/12; H04L 47/27
See application file for complete search history.

(56) References Cited

U.S. PATENT DOCUMENTS

2008/0232339 A1* 9/2008 Yang ................. H04W 72/1215
370/342
2012/0120944 A1 5/2012 Yang et al.
(Continued)

FOREIGN PATENT DOCUMENTS

CN 103210697 A 7/2013
CN 104812080 A 7/2015
(Continued)

OTHER PUBLICATIONS

Zhang Li-da, "The Research and Implementation of MAC Layer Based on IEEE 802.11", College of Communication Engineering of Chongqing University; 74 pages; May 24, 2008, with English abstract.
(Continued)

*Primary Examiner* — Mohammad S Anwar
(74) *Attorney, Agent, or Firm* — Cantor Colburn LLP

(57) ABSTRACT

A data transmission method and device for multiple radio frequency systems, a storage medium and a terminal are provided. The multiple radio frequency systems multiplex a shared radio frequency component to transmit Wi-Fi data and non-Wi-Fi data, during a Wi-Fi time slice for transmitting the Wi-Fi data, a plurality of Transmission Opportunity Periods (TxOPs) are allocated to transmit a plurality of data packets of the Wi-Fi data, and the method includes, when allocating each of the plurality of TxOPs, determining whether the TxOP to be allocated exceeds the Wi-Fi time slice; and if the TxOP to be allocated exceeds the Wi-Fi time slice, adjusting the TxOP to be allocated to make the adjusted TxOP do not exceed the Wi-Fi time slice. Embodiments of the present disclosure may facilitate the multiple radio frequency systems sharing a single antenna, thereby realizing coexistence of different radio frequency systems.

12 Claims, 2 Drawing Sheets when each of the plurality of TxOPs is allocated, whether the TxOP to be allocated exceeds the Wi-Fi time slice is determined — S101 if the TxOP to be allocated exceeds the Wi-Fi time slice, the TxOP to be allocated is adjusted to make the adjusted TxOP do not exceed the Wi-Fi time slice — S102

(56) References Cited

U.S. PATENT DOCUMENTS

| | | | |
|---|---|---|---|
| 2014/0078969 A1* | 3/2014 | Guo | H04W 72/121 |
| | | | 370/329 |
| 2015/0043478 A1 | 2/2015 | Mackenzie | |
| 2017/0231003 A1 | 8/2017 | Godana et al. | |
| 2019/0045370 A1* | 2/2019 | Al-Fanek | H04W 24/08 |

FOREIGN PATENT DOCUMENTS

| | | | |
|---|---|---|---|
| CN | 106538028 A | 3/2017 | |
| CN | 109152057 A | 1/2019 | |
| WO | 2017027471 A1 | 2/2017 | |
| WO | 2018144344 A1 | 8/2018 | |
| WO | 2020172982 A1 | 9/2020 | |

OTHER PUBLICATIONS

International Search Report for International Application No. PCT/CN2019/083826; dated Nov. 27, 2019.

* cited by examiner when each of the plurality of TxOPs is allocated, whether the TxOP to be allocated exceeds the Wi-Fi time slice is determined — S101 if the TxOP to be allocated exceeds the Wi-Fi time slice, the TxOP to be allocated is adjusted to make the adjusted TxOP do not exceed the Wi-Fi time slice — S102

DATA TRANSMISSION METHOD AND DEVICE FOR MULTIPLE RADIO FREQUENCY SYSTEMS, STORAGE MEDIUM AND TERMINAL

This is the U.S. National state of application No. PCT/CN2019/083826, filed on Apr. 23, 2019. Priority under 35 U.S.C § 119(a) and 35 U.S.C. § 365(b) is claimed to Chinese Application No. 201910142207.5 filed Feb. 26, 2019, and entitled "DATA TRANSMISSION METHOD AND DEVICE FOR MULTIPLE RADIO FREQUENCY SYSTEMS, STORAGE MEDIUM AND TERMINAL", the entire disclosure of which is also incorporated herein by reference.

TECHNICAL FIELD

The present disclosure generally relates to communication technology field, and more particularly, to a data transmission method and device for multiple radio frequency (RF) systems, a storage medium and a terminal.

BACKGROUND

At present, to reduce cost and save power consumption, a Wireless Fidelity (Wi-Fi) RF system and a Long Term Evolution (LTE) RF system on a same terminal usually share a single antenna to transmit Wi-Fi data and LTE data. When the shared antenna is used, a Time Division Duplex (TDD) mechanism is generally adopted to allocate different time slices for Wi-Fi and LTE, so that Wi-Fi data and LTE data are sent and received within their time slices respectively.

In the TDD mechanism, an air interface time occupied by data packets transmitted by Wi-Fi may be short or long, and in some cases, Wi-Fi transmission may occupy LTE time slices. Existing solutions provided for solving this problem still have shortcomings, and further study is needed.

SUMMARY

In embodiments of the present disclosure, a Wi-Fi transmission duration is adjusted to facilitate multiple RF systems sharing a single antenna, thereby realizing coexistence of different RF systems.

Embodiments of the present disclosure provide a data transmission method for multiple RF systems, wherein the multiple RF systems multiplex a shared RF component to transmit Wi-Fi data and non-Wi-Fi data, during a Wi-Fi time slice for transmitting the Wi-Fi data, a plurality of Transmission Opportunity Periods (TxOPs) are allocated to transmit a plurality of data packets of the Wi-Fi data, and the method includes: when allocating each of the plurality of TxOPs, determining whether the TxOP to be allocated exceeds the Wi-Fi time slice; and if the TxOP to be allocated exceeds the Wi-Fi time slice, adjusting the TxOP to be allocated to make the adjusted TxOP do not exceed the Wi-Fi time slice.

Optionally, the method further includes: determining whether transmission of a current data packet can be completed within the adjusted TxOP; and if the transmission of the current data packet can be completed within the adjusted TxOP, allocating the adjusted TxOP and transmitting the current data packet, and if the transmission of the current data packet cannot be completed within the adjusted TxOP, not allocating the adjusted TxOP.

Optionally, a transmission duration of the current data packet includes a total transmission duration of the current data packet and its acknowledgement packet, and determining whether the transmission of the current data packet can be completed within the adjusted TxOP includes: calculating the total transmission duration of the current data packet and its acknowledgement packet; and determining whether the total transmission duration exceeds the adjusted TxOP.

Optionally, the method further includes: if the transmission of the current data packet can be completed within the adjusted TxOP, after the adjusted TxOP expires, generating a non-zero Carrier Sense Multiple Access (CSMA) backoff count value using a CSMA backoff counter.

Optionally, the method further includes: if the transmission of the current data packet cannot be completed within the adjusted TxOP, within the adjusted TxOP, generating a non-zero CSMA backoff count value using a CSMA backoff counter.

Optionally, after generating the non-zero CSMA backoff count value using the CSMA backoff counter, the method further includes: adjusting the CSMA backoff counter, so that the non-zero CSMA backoff count value is greater than 0 in a non-Wi-Fi time slice, wherein the non-Wi-Fi time slice is used for transmitting the non-Wi-Fi data.

Optionally, the adjusted CSMA backoff counter adopts a maintaining mode for counting, and the maintaining mode includes: after the non-zero CSMA backoff count value is decreased by a preset value to obtain a decreased backoff count value, maintaining the decreased backoff count value until the non-Wi-Fi time slice expires, and continuing decreasing the decreased backoff count value after the non-Wi-Fi time slice expires, wherein the preset value is a non-negative integer.

Optionally, the adjusted CSMA backoff counter adopts a resetting mode for counting, and the resetting mode includes repeating following operations until the non-Wi-Fi time slice expires: performing CSMA backoff counting from generating the non-zero CSMA backoff count value, and when the non-zero CSMA backoff count value is decreased by a preset value and the non-Wi-Fi time slice is not reached, resetting the CSMA backoff counter to the generated non-zero CSMA backoff count value, and performing the CSMA backoff counting again, wherein the preset value is a non-zero integer.

Embodiments of the present disclosure further provide a data transmission device for multiple RF systems, wherein the multiple RF systems multiplex a shared RF component to transmit Wi-Fi data and non-Wi-Fi data, during a Wi-Fi time slice for transmitting the Wi-Fi data, a plurality of TxOPs are allocated to transmit a plurality of data packets of the Wi-Fi data, and the device includes: a first determining circuitry configured to: when each of the plurality of TxOPs is being allocated, determine whether the TxOP to be allocated exceeds the Wi-Fi time slice; and a first adjusting circuitry configured to: if the TxOP to be allocated exceeds the Wi-Fi time slice, adjust the TxOP to be allocated to make the adjusted TxOP do not exceed the Wi-Fi time slice.

Embodiments of the present disclosure further provide a storage medium having computer instructions stored thereon, wherein once the computer instructions are executed, the above method is performed.

Embodiments of the present disclosure further provide a terminal including a memory and a processor, wherein the memory has computer instructions stored thereon, and once the processor executes the computer instructions, the above method is performed.

Embodiments of the present disclosure may provide following advantages.

In the embodiments of the present disclosure, a data transmission method for multiple RF systems is provided, wherein the multiple RF systems multiplex a shared RF component to transmit Wi-Fi data and non-Wi-Fi data, during a Wi-Fi time slice for transmitting the Wi-Fi data, a plurality of TxOPs are allocated to transmit a plurality of data packets of the Wi-Fi data, and the method includes: when allocating each of the plurality of TxOPs, determining whether the TxOP to be allocated exceeds the Wi-Fi time slice; and if the TxOP to be allocated exceeds the Wi-Fi time slice, adjusting the TxOP to be allocated to make the adjusted TxOP do not exceed the Wi-Fi time slice. With the embodiments, before the Wi-Fi data is transmitted, the allocated TxOP to be allocated is adjusted so that a transmission time of the Wi-Fi data does not exceed the Wi-Fi time slice. Further, adjusting the Wi-Fi transmission time is conducive to sharing of the single antenna by the multiple RF systems, thereby achieving coexistence of the different RF systems.

Further, the data transmission method further includes: if the transmission of the current data packet can be completed within the adjusted TxOP, after the adjusted TxOP expires, generating a non-zero CSMA backoff count value using a CSMA backoff counter. With the embodiments, when it comes to the Wi-Fi time slice from the non-Wi-Fi time slice, there is no need to perform channel contention using traditional CSMA which is adopted during an initial access to a Wi-Fi network, so that transmission of Wi-Fi data may restore as soon as possible and Wi-Fi performance may be improved, thereby further improving performance of a whole system.

DETAILED DESCRIPTION

Figures 1, 2:
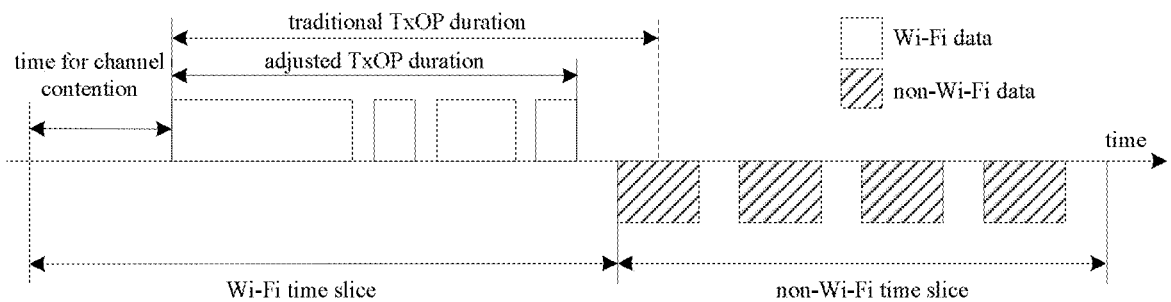
FIG. 1 is a flow chart of a data transmission method for multiple RF systems according to an embodiment.
FIG. 2 is a diagram of time slice allocation according to the embodiment as shown in FIG. 1.

As described in the background, in existing techniques, when Wi-Fi shares a single antenna with other radio technologies, there are deficiencies and improvement is needed.

Inventors of the present disclosure found through research that in the existing techniques, when Wi-Fi shares a single antenna with other radio technologies (for example, LTE technology), two ways are provided to stop Wi-Fi transmission, including a suspension mode and an aborting mode. For both the two modes, when the Wi-Fi time slice is about to expire, a command (for example, a suspension command or an aborting command) is issued to Wi-Fi to stop Wi-Fi transmission so as to enter the suspension mode or the aborting mode.

Afterward, a suspension revocation command or an aborting revocation command is issued to Wi-Fi to retransmit Wi-Fi data. In the suspension mode and the aborting mode, after the Wi-Fi transmission is stopped, related status of the Wi-Fi transmission is also cleared, so that Wi-Fi needs to perform a CSMA backoff mechanism again for channel contention in subsequent Wi-Fi time slices, which reduces Wi-Fi performance.

Further, for Wi-Fi in the suspension mode, if Wi-Fi data packets are transmitted when the suspension command is issued, Wi-Fi may not enter the suspension mode until current data exchange is completed.

As Wi-Fi will wait for the completion of the current data exchange, an air interface time occupied by the transmitted Wi-Fi data may exceed the Wi-Fi time slice, causing the currently transmitted Wi-Fi data to affect transmission and reception of non-Wi-Fi data within a non-Wi-Fi (for example, LTE) time slice, which reduces transmission performance of the non-Wi-Fi system.

For Wi-Fi in the aborting mode, if Wi-Fi data is transmitted when the aborting command is issued, the Wi-Fi data currently being transmitted may be aborted immediately and Wi-Fi may enter the aborting mode directly, which undoubtedly causes a failure of the current Wi-Fi data transmission. And the Wi-Fi data needs to be retransmitted in a next Wi-Fi time slice, thereby reducing transmission performance of the Wi-Fi system.

In the embodiments of the present disclosure, a data transmission method for multiple RF systems is provided, wherein the multiple RF systems multiplex a shared RF component to transmit Wi-Fi data and non-Wi-Fi data, during a Wi-Fi time slice for transmitting the Wi-Fi data, a plurality of TxOPs are allocated to transmit a plurality of data packets of the Wi-Fi data, and the method includes: when allocating each of the plurality of TxOPs, determining whether the TxOP to be allocated exceeds the Wi-Fi time slice; and if the TxOP to be allocated exceeds the Wi-Fi time slice, adjusting the TxOP to be allocated to make the adjusted TxOP do not exceed the Wi-Fi time slice. With the embodiments, before the Wi-Fi data is transmitted, the allocated TxOP to be allocated is adjusted so that a transmission time of the Wi-Fi data does not exceed the Wi-Fi time slice. Further, adjusting the Wi-Fi transmission time is conducive to sharing of the single antenna by the multiple RF systems, thereby achieving coexistence of the different RF systems.

In order to clarify the objects, characteristics and advantages of the disclosure, embodiments of present disclosure will be described in detail in conjunction with accompanying drawings.

FIG. 1 is a flow chart of a data transmission method for multiple RF systems according to an embodiment. The multiple RF systems may multiplex a shared RF component to transmit Wi-Fi data and non-Wi-Fi data.

In practice, the non-Wi-Fi data may be LTE data or data of other radio access technologies. The RF component refers to a single RF antenna, and is referred to as a single antenna for short.

The multiple RF systems may transmit Wi-Fi data and non-Wi-Fi data using TDD. Wi-Fi data is generally transmitted within Wi-Fi time slices. Wi-Fi may use the CSMA mechanism to acquire channel usage right for a time period in Wi-Fi time slices. In the Wi-Fi time slices used to transmit the Wi-Fi data, when the terminal acquires the channel usage right, TxOPs are allocated to transmit multiple data packets of Wi-Fi data using a TxOP mechanism defined in the Institute of Electrical and Electronics Engineers (IEEE) 802.11e.

Specifically, in the Wi-Fi time slice, the terminal may obtain the TxOPs through the CSMA backoff mechanism. In a current protocol, a maximum duration of a TxOP is determined by a priority of Quality of Service (QoS) of data packets transmitted by Wi-Fi (for example, an AP or a router) in the TxOP, that is, the duration of the single TxOP is fixed. In addition, generally, an air interface time occupied by data packets transmitted by Wi-Fi does not exceed the duration of the TxOP.

In some embodiments, the data transmission method may include S101 and S102.

In S101, when each of the plurality of TxOPs is allocated, whether the TxOP to be allocated exceeds the Wi-Fi time slice is determined.

In S102, if the TxOP to be allocated exceeds the Wi-Fi time slice, the TxOP to be allocated is adjusted to make the adjusted TxOP do not exceed the Wi-Fi time slice.

Specifically, in S101, within the Wi-Fi time slice, the terminal may contend for a channel through CSMA. If the terminal succeeds in contending the channel and acquires a channel usage right, the terminal can allocate the TxOPs.

When allocating the TxOP, the terminal needs to determine whether the TxOP to be allocated exceeds the Wi-Fi time slice.

In S102, the terminal may determine whether to adjust the TxOP according to a determination result. If the TxOP to be allocated does not exceed the Wi-Fi time slice, the terminal can still allocate a traditional TxOP, and transmit Wi-Fi data packets in the allocated TxOP.

If the TxOP to be allocated exceeds the Wi-Fi time slice, the terminal adjusts the TxOP so that the adjusted TxOP does not exceed the Wi-Fi time slice.

Further, whether an exchange process of Wi-Fi transmission can be completed within the adjusted TxOP is determined. If the exchange process of Wi-Fi transmission can be completed within the adjusted TxOP, the allocation of the adjusted TxOP is performed, otherwise, the allocation of the adjusted TxOP is not performed.

The exchange process of Wi-Fi transmission refers to a process in which the terminal sends a Wi-Fi data packet and receives feedback information of the Wi-Fi data packet. Under this condition, a total transmission duration of the current data packet and its acknowledgement packet is determined, and whether the total transmission duration exceeds the adjusted TxOP is determined. If the total transmission duration exceeds the adjusted TxOP, the current data packet is no longer transmitted; otherwise, in the adjusted TxOP, an exchange process of the current data packet and its feedback information is performed.

Alternatively, the exchange process of Wi-Fi transmission may refer to a process in which the terminal sends a Wi-Fi data packet but not including receiving feedback information of the Wi-Fi data packet. Under this condition, a transmission duration of the current data packet is calculated, and it is determined whether the transmission duration exceeds the adjusted TxOP. If the transmission duration exceeds the adjusted TxOP, the current data packet is no longer transmitted; otherwise, the current data packet is transmitted within the adjusted TxOP.

To clearly explain the embodiment as shown in FIG. 1, FIG. 2 illustrates time slice allocation according to the embodiment as shown in FIG. 1. Referring to FIG. 2, time is divided into time periods, and each time period includes a Wi-Fi time slices and a non-Wi-Fi time slice. In the non-Wi-Fi time slice, non-Wi-Fi data is generally transmitted; and in the Wi-Fi time slice, Wi-Fi data is transmitted after the channel usage right is acquired with successful channel contention (time for channel contention is shown in FIG. 2). When the existing technique is used to acquire the channel usage right, a duration of the channel usage right may be the traditional TxOP duration as shown in FIG. 2. When the traditional TxOP duration exceeds the Wi-Fi time slice, the TxOP may be adjusted by the embodiments of the present disclosure, so that the total duration of the adjusted TxOP does not exceed the Wi-Fi time slice. FIG. 2 illustrates the total duration of the adjusted TxOP.

Those skilled in the art could understand that in a traditional Wi-Fi system, channel contention is implemented using the CSMA backoff mechanism. The CSMA backoff mechanism includes continuously monitoring a channel when it is detected that the channel is idle, and randomly selecting a CSMA backoff count value after an idle time of the channel reaches a preset time interval (for example, Extended Interframe Space (EIFS)), so as to acquire a CSMA backoff time window. In the CSMA backoff time window, if the channel is still in an idle status, the backoff count value (i.e., the backoff time window) gradually decreases with time. If the channel is always idle while the CSMA backoff count value decreases to 0, Wi-Fi may acquire the channel usage right of the channel and Wi-Fi data transmission is performed.

In the embodiments of the present disclosure, based on the feature that Wi-Fi data is transmitted only after the CSMA backoff count value decreases to 0, when the Wi-Fi time slice is about to expire, the CSMA backoff count mode is adjusted so that the CSMA backoff time window is always greater than 0 within the non-Wi-Fi time slice (for example, an LTE time slice), thereby avoiding performing Wi-Fi transmission in non-Wi-Fi time slices. After it comes to the Wi-Fi time slice from the non-Wi-Fi time slice, there is no need to wait for an idle time of the channel reaching a preset time interval (for example, EIFS), the CSMA backoff count value can directly continue decreasing to 0, and non-Wi-Fi data is transmitted.

In some embodiments, no matter whether the transmission of the current data packet can be completed within the adjusted TxOP, a CSMA backoff counter may be used to generate a non-zero CSMA backoff count value.

In some embodiments, if the transmission of the current data packet can be completed within the adjusted TxOP, the CSMA backoff counter may be used to generate a non-zero CSMA backoff count value after the adjusted TxOP expires.

In some embodiments, if the transmission of the current data packet cannot be completed within the adjusted TxOP, the CSMA backoff counter may be used to generate a non-zero CSMA backoff count value within the adjusted TxOP.

In some embodiments, the adjusted CSMA backoff counter may adopt a maintaining mode or a resetting mode for counting, so that Wi-Fi data is not transmitted within non-Wi-Fi time slices. Further, the maintaining mode or the resetting mode enables the terminal not to perform channel contention using the CSMA backoff mechanism in the existing techniques, so that the terminal can transmit Wi-Fi data immediately after the non-Wi-Fi time slice ends.

In some embodiments, the maintaining mode includes: after the non-zero CSMA backoff count value is decreased by a preset value to obtain a decreased backoff count value, maintaining the decreased backoff count value until the non-Wi-Fi time slice expires, and continuing decreasing the decreased backoff count value after the non-Wi-Fi time slice expires, wherein the preset value is a non-negative integer. If the CSMA backoff count value decreases to 0, Wi-Fi transmission may restore.

In some embodiments, the resetting mode includes repeating following operations until the non-Wi-Fi time slice expires: performing CSMA backoff counting from generating the non-zero CSMA backoff count value, and when the non-zero CSMA backoff count value is decreased by a preset value and the non-Wi-Fi time slice is not reached, resetting the CSMA backoff counter to the generated non-zero CSMA backoff count value, and performing the CSMA backoff counting again, wherein the preset value is a non-zero integer.

Specifically, in the non-Wi-Fi time slice, a non-zero CSMA count value is generated as the initial backoff value, and backoff is started from the non-zero CSMA count value to reduce the CSMA backoff time window. During the reduction process, if the non-Wi-Fi time slice is not reached, the backoff count value is reset to the initial backoff value, and decreases by the preset value again, and the above execution is repeated. The above reduction and resetting process continues until the entire non-Wi-Fi time slice ends. After the non-Wi-Fi time slice ends, the CSMA backoff time window may still continue decreasing in a manner prescribed by a protocol, and is not reset. If the CSMA backoff time window decreases to 0, Wi-Fi transmission may restore.

Figure 3:
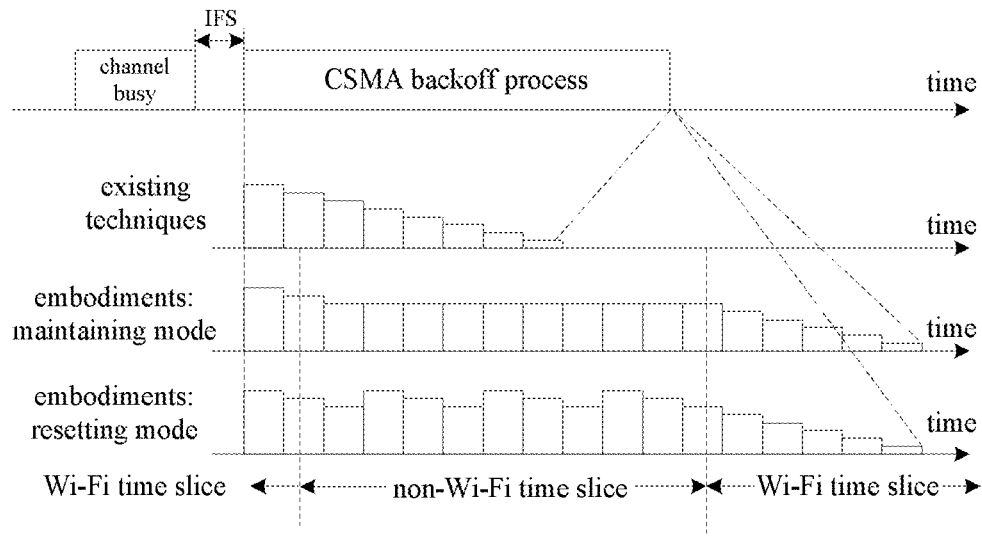
FIG. 3 is a diagram of variation of CSMA backoff count values according to an embodiment.

FIG. 3 is a diagram of variation of CSMA backoff count values according to an embodiment. Referring to FIG. 3, when another terminal occupies a channel to transmit Wi-Fi data, the channel is busy, and after the Wi-Fi data transmission ends, the another terminal releases the channel. Further, after an Interframe Space (IFS) time, a terminal may perform a CSMA backoff process. For traditional CSMA, after a backoff count value is randomly generated, regardless of whether the terminal is in the Wi-Fi time slice, the CSMA backoff time window is decreased. When the backoff count value decreases to 0, a channel usage right is acquired. However, at this time, the terminal is in the non-Wi-Fi time slice, thus non-Wi-Fi data transmission may be affected.

For the CSMA backoff mechanism provided by the embodiments of the present disclosure, if the maintaining mode is adopted, after the backoff count value is randomly generated, the terminal located in the non-Wi-Fi time slice decreases the backoff count value by the preset value (in FIG. 3, the preset value is 2), and then maintains the backoff count value until the non-Wi-Fi time slice expires. After the non-Wi-Fi time slice expires and it comes to the Wi-Fi time slice, the backoff count value continues decreasing. When the backoff count value decreases to 0, the channel usage right is acquired and Wi-Fi data is transmitted.

For the CSMA back-off mechanism provided by the embodiments of the present disclosure, if the resetting mode is adopted, after the back-off count value is randomly generated, the terminal in the non-Wi-Fi time slice decreases the backoff count value by the preset value (in FIG., the preset value is 2), and then resets the backoff count value to the initially generated backoff count value, until the non-Wi-Fi time slice expires. After the non-Wi-Fi time slice expires and it comes to the Wi-Fi time slice, the backoff count value continues decreasing. When the backoff count value decreases to 0, the channel usage right is acquired and Wi-Fi data is transmitted.

Those skilled in the art could understand that FIG. 3 merely schematically start and end times of the non-Wi-Fi time slice and the Wi-Fi time slice, and a duration of the CSMA backoff process. In practice, a time for generating the CSMA backoff count value is generally within the Wi-Fi time slice. In the non-Wi-Fi time slice, the maintaining mode or the resetting mode is adopted to prevent the generated CSMA backoff count value from decreasing to 0, and when a next Wi-Fi time slice arrives, the CSMA backoff count value continues decreasing according to the traditional CSMA backoff mechanism.

From above, by the embodiments of the present disclosure, performance of systems when Wi-Fi and non-Wi-Fi share a single antenna is optimized. On one hand, by adjusting the TxOPs, the Wi-Fi transmission does not exceed the Wi-Fi time slice, thereby avoiding Wi-Fi data transmission in the non-Wi-Fi time slice and effectively improving the performance of the non-Wi-Fi system. On the other hand, by adjusting the CSMA backoff mechanism, it is possible to ensure the completion of Wi-Fi data exchange within the Wi-Fi time slice, thereby effectively reducing suspension of current Wi-Fi transmission and degradation of Wi-Fi system performance. In addition, technical solutions provided by the embodiments of the present disclosure do not affect data reception and transmission of other terminals that share a single antenna using the existing techniques, thus, coexistence with other terminals is guaranteed and accordingly good compatibility is provided.

Figure 4:
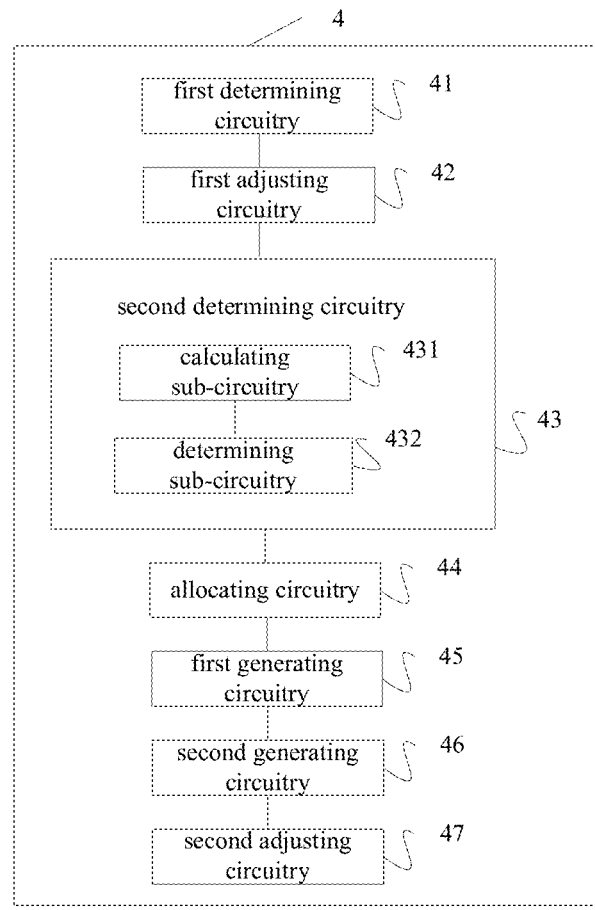
FIG. 4 is a structural diagram of a data transmission device for multiple RF systems according to an embodiment.

FIG. 4 is a structural diagram of a data transmission device for multiple RF systems according to an embodiment. The multiple RF systems multiplex a shared RF component to transmit Wi-Fi data and non-Wi-Fi data, and during a Wi-Fi time slice for transmitting the Wi-Fi data, a plurality of TxOPs are allocated to transmit a plurality of data packets of the Wi-Fi data. The data transmission device 4 for the multiple RF systems may perform the method as shown in FIG. 1 to FIG. 3 and may be mounted on a device having a shared antenna.

In some embodiments, the device 4 includes: a first determining circuitry 41 configured to: when each of the plurality of TxOPs is being allocated, determine whether the TxOP to be allocated exceeds the Wi-Fi time slice; and a first adjusting circuitry 42 configured to: if the TxOP to be allocated exceeds the Wi-Fi time slice, adjust the TxOP to be allocated to make the adjusted TxOP do not exceed the Wi-Fi time slice.

In some embodiments, the data transmission device 4 further includes: a second determining circuitry 43 configured to determine whether transmission of a current data packet can be completed within the adjusted TxOP; and an allocating circuitry 44 configured to: if the transmission of the current data packet can be completed within the adjusted TxOP, allocate the adjusted TxOP and transmit the current data packet, and if the transmission of the current data packet cannot be completed within the adjusted TxOP, not allocate the adjusted TxOP.

In some embodiments, a transmission duration of the current data packet includes a total transmission duration of the current data packet and its acknowledgement packet, and the second determining circuitry 43 includes: a calculating sub-circuitry 431 configured to calculate the total transmission duration of the current data packet and its acknowledgement packet; and a determining sub-circuitry 432 configured to determine whether the total transmission duration exceeds the adjusted TxOP.

In some embodiments, the device 4 further includes a first generating circuitry 45 configured to: if the transmission of the current data packet can be completed within the adjusted TxOP, after the adjusted TxOP expires, generate a non-zero CSMA backoff count value using a CSMA backoff counter.

In some embodiments, the device 4 further includes a second generating circuitry 46 configured to: if the transmission of the current data packet cannot be completed within the adjusted TxOP, within the adjusted TxOP, generate a non-zero CSMA backoff count value using a CSMA backoff counter.

In some embodiments, the device 4 further includes a second adjusting circuitry 47 configured to: after the non-zero CSMA backoff count value is generated using the CSMA backoff counter, adjust the CSMA backoff counter, so that the non-zero CSMA backoff count value is greater than 0 in a non-Wi-Fi time slice, wherein the non-Wi-Fi time slice is used for transmitting the non-Wi-Fi data.

In some embodiments, the adjusted CSMA backoff counter adopts a maintaining mode for counting, and the maintaining mode includes: after the non-zero CSMA backoff count value is decreased by a preset value to obtain a decreased backoff count value, maintaining the decreased backoff count value until the non-Wi-Fi time slice expires, and continuing decreasing the decreased backoff count value after the non-Wi-Fi time slice expires, wherein the preset value is a non-negative integer.

In some embodiments, the adjusted CSMA backoff counter adopts a resetting mode for counting, and the resetting mode includes repeating following operations until the non-Wi-Fi time slice expires: performing CSMA backoff counting from generating the non-zero CSMA backoff count value, and when the non-zero CSMA backoff count value is decreased by a preset value and the non-Wi-Fi time slice is not reached, resetting the CSMA backoff counter to the generated non-zero CSMA backoff count value, and performing the CSMA backoff counting again, wherein the preset value is a non-zero integer.

More details about working principles and working modes of the data transmission device 4 shown in FIG. 4 may be referred to the above description of FIGS. 1 to FIG. 3, and are not described here.

Embodiments of the present disclosure further provide a storage medium having computer instructions stored thereon, wherein once the computer instructions are executed, the above method as shown in FIG. 1 to FIG. 3 is performed. In some embodiments, the storage medium may include a computer readable storage medium which may be a Read Only Memory (ROM), a Random Access Memory (RAM), a magnetic disk or an optical disk.

Embodiments of the present disclosure further provide a terminal including a memory and a processor, wherein the memory has computer instructions stored thereon, and once the processor executes the computer instructions, the above method as shown in FIG. 1 to FIG. 3 is performed. In some embodiments, the terminal may be a user equipment that multiplexes a same RF antenna for Wi-Fi data transmission and LTE data transmission.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A data transmission method for multiple radio frequency systems, wherein the multiple radio frequency systems multiplex a shared radio frequency component to transmit Wi-Fi data and non-Wi-Fi data, during a Wi-Fi time slice for transmitting the Wi-Fi data, a plurality of Transmission Opportunity Periods (TxOPs) are allocated to transmit a plurality of data packets of the Wi-Fi data, and the method comprises:

during allocation of each of the plurality of TxOPs, determining whether the TxOP exceeds the Wi-Fi time slice;

based on the TxOP exceeding the Wi-Fi time slice, adjusting the TxOP to make the adjusted TxOP do not exceed the Wi-Fi time slice;

determining whether transmission of a current data packet can be completed within the adjusted TxOP;

based on that the transmission of the current data packet can be completed within the adjusted TxOP, allocating the adjusted TxOP and transmitting the current data packet, and generating a non-zero Carrier Sense Multiple Access (CSMA) backoff count value using a CSMA backoff counter after the adjusted TxOP expires; and based on that the transmission of the current data packet cannot be completed within the adjusted TxOP, not allocating the adjusted TxOP.

2. The data transmission method according to claim 1, wherein a transmission duration of the current data packet comprises a total transmission duration of the current data packet and its acknowledgement packet, and determining whether the transmission of the current data packet can be completed within the adjusted TxOP comprises:

calculating the total transmission duration of the current data packet and its acknowledgement packet; and determining whether the total transmission duration exceeds the adjusted TxOP.

3. The data transmission method according to claim 1, further comprising:

based on that the transmission of the current data packet cannot be completed within the adjusted TxOP, within the adjusted TxOP, generating a non-zero CSMA backoff count value using a CSMA backoff counter.

4. The data transmission method according to claim 3, wherein after generating the non-zero CSMA backoff count value using the CSMA backoff counter, the method further comprises:

adjusting the CSMA backoff counter, so that the non-zero CSMA backoff count value is greater than 0 in a non-Wi-Fi time slice, wherein the non-Wi-Fi time slice is used for transmitting the non-Wi-Fi data.

5. The data transmission method according to claim 4, wherein the adjusted CSMA backoff counter adopts a maintaining mode for counting, and the maintaining mode comprises:

after the non-zero CSMA backoff count value is decreased by a preset value to obtain a decreased backoff count value, maintaining the decreased backoff count value until the non-Wi-Fi time slice expires, and continuing decreasing the decreased backoff count value after the non-Wi-Fi time slice expires, wherein the preset value is a non-negative integer.

6. The transmission method according to claim 4, wherein the adjusted CSMA backoff counter adopts a resetting mode for counting, and the resetting mode comprises repeating following operations until the non-Wi-Fi time slice expires:

performing CSMA backoff counting from generating the non-zero CSMA backoff count value, and based on the non-zero CSMA backoff count value being decreased by a preset value and the non-Wi-Fi time slice being not reached, resetting the CSMA backoff counter to the generated non-zero CSMA backoff count value, and performing the CSMA backoff counting again, wherein the preset value is a non-zero integer.

7. The data transmission method according to claim 1, wherein after generating the non-zero CSMA backoff count value using the CSMA backoff counter, the method further comprises:

adjusting the CSMA backoff counter, so that the non-zero CSMA backoff count value is greater than 0 in a non-Wi-Fi time slice, wherein the non-Wi-Fi time slice is used for transmitting the non-Wi-Fi data.

8. The data transmission method according to claim 7, wherein the adjusted CSMA backoff counter adopts a maintaining mode for counting, and the maintaining mode comprises:

after the non-zero CSMA backoff count value is decreased by a preset value to obtain a decreased backoff count value, maintaining the decreased backoff count value until the non-Wi-Fi time slice expires, and continuing decreasing the decreased backoff count value after the non-Wi-Fi time slice expires, wherein the preset value is a non-negative integer.

9. The transmission method according to claim 7, wherein the adjusted CSMA backoff counter adopts a resetting mode for counting, and the resetting mode comprises repeating following operations until the non-Wi-Fi time slice expires:

performing CSMA backoff counting from generating the non-zero CSMA backoff count value, and based on the non-zero CSMA backoff count value being decreased by a preset value and the non-Wi-Fi time slice being not reached, resetting the CSMA backoff counter to the generated non-zero CSMA backoff count value, and performing the CSMA backoff counting again, wherein the preset value is a non-zero integer.

10. A storage medium having computer instructions stored thereon, wherein once the computer instructions are executed, the method according to claim 1 is performed.

11. A terminal comprising a memory and a processor, wherein the memory has computer instructions stored thereon, and once the processor executes the computer instructions, the method according to claim 1 is performed.

12. A data transmission device for multiple radio frequency systems, wherein the multiple radio frequency systems multiplex a shared radio frequency component to transmit Wi-Fi data and non-Wi-Fi data, during a Wi-Fi time slice for transmitting the Wi-Fi data, a plurality of Transmission Opportunity Periods (TxOPs) are allocated to transmit a plurality of data packets of the Wi-Fi data, and the device comprises:

a first determining circuitry configured to: during allocation of each of the plurality of TxOPs, determine whether the TxOP exceeds the Wi-Fi time slice;

a first adjusting circuitry configured to: based on the TxOP exceeding the Wi-Fi time slice, adjust the TxOP to make the adjusted TxOP do not exceed the Wi-Fi time slice;

a second determining circuitry configured to determine whether transmission of a current data packet can be completed within the adjusted TxOP;

an allocating circuitry configured to: based on that the transmission of the current data packet can be completed within the adjusted TxOP, allocate the adjusted TxOP and transmit the current data packet, and based on that the transmission of the current data packet cannot be completed within the adjusted TxOP, not allocate the adjusted TxOP; and a first generating circuitry configured to: based on that the transmission of the current data packet can be completed within the adjusted TxOP, generate a non-zero CSMA backoff count value using a CSMA backoff counter after the adjusted TxOP expires.

* * * * *